June 18, 1940.  J. H. HOTSON  2,204,595

WEIGHING DEVICE OF THE BALANCE TYPE

Filed April 20, 1937

INVENTOR.
John H. Hotson
BY Edmond Livingston Brown
ATTORNEY.

Patented June 18, 1940

2,204,595

UNITED STATES PATENT OFFICE 2,204,595

WEIGHING DEVICE OF THE BALANCE TYPE

John H. Hotson, Woodside, N. Y.

Application April 20, 1937, Serial No. 137,909

6 Claims. (Cl. 265—34)

The invention relates to weighing devices of the balance type; and it particularly relates to such form of device which may be incorporated in construction with an elongated article used for purposes related to weighing. This application is a continuation in part of my co-pending application bearing Serial Number 731,255, filed June 19, 1934, on which Letters Patent No. 2,078,249 issued on April 27, 1937, the subject matter shown in Fig. 1 of this application having been described in the specification of said co-pending application.

One of the principal objects of my invention is to provide a simple and efficient means by which any one of a number of common articles, such as pencils, pens, measuring rules, walking sticks, screw drivers, fishing rods, or any other elongated article in common use which is readily handled, and in connection with which, or even not related to which, it is desirable to ascertain weights of objects handled or dealt with when a regular scale is not at hand, may be readily converted into devices for weighing objects, and back again into their original functional form, in which latter state the extra means are so arranged in and against the body of the article itself as not to interfere with the ordinary use of the article. Further objects and advantages of the invention will be in part set forth in the following specification, and in part will be obvious therefrom without being specifically pointed out, the same being realized and attained as hereinafter more fully described or as pointed out in the claims thereof.

With the above and other objects of the invention in view, the invention consists in the novel construction, arrangement and combination of various devices, elements and parts, as set forth in the claims hereof, certain embodiments of the same being illustrated in the accompanying drawing and described in this specification.

In the accompanying drawing.

Figure 1:
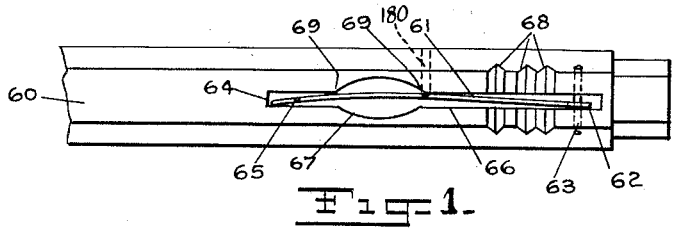
Fig. 1 is a bottom view of one embodiment of my invention, showing the same incorporated in the body of a mechanical pencil of a type in common use, the lead-bearing tip of the pencil not being shown, and the cap at the top end having been removed.

In carrying my invention into effect in the embodiment thereof which has been selected for illustration in Fig. 1, it will be seen that there is provided a mechanical pencil of a type in common use, the main body portion of such a pencil of octagonal form being designated 60, the lead-bearing tip being broken away at the left, and the cap commonly provided at the opposite end of such pencils having been removed from its ordinary position at the right hand end.

A retractable suspensory member 61 is provided. Pivoted to the body 60 by means of the ring portion 62 thereof, which engages with a pin 63, the ends of which are secured in said body 60. The member 61 is provided at its free end with a hook composed of a shoulder 64 and a pointed end 65, from which hook an envelope or other object may be suspended by engaging it upon the point of the hook, or otherwise.

The body 60 is provided with a slot 66, which is adapted to receive the member 61 when same is in its retracted position, so that the said member 61 will lie flush with the surface of the body 60. An enlarged finger-nail hold 67 is hollowed out from the sides of this slot 66, in order that the member 61 may be swung out when required for use.

In this embodiment of the invention the suspensory member 61 is made of resilient material, and while in its inoperative position is secured in the slot 66 by incorporating a slight bend or bowing laterally in said member 61, so that when forced into the slot 66, it will be straightened out against its natural rest form, and thus bear resiliently against the sides of the slot 66 at the points 69 and be retained therein by friction. In removing the member 61 from the slot 66, or replacing it therein, said member 61 is pressed or forced by the fingers laterally, sufficiently into line with the slot 66 to permit the member 61 to be engaged or disengaged. A pin 180 may be provided having its upper end projecting into the upper part of the slot 66 at one side thereof for a short distance, in order positively to catch and hold the member 61 in its folded or inoperative position when desired.

Figure 4:
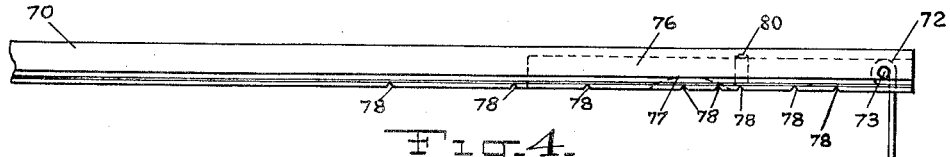
Fig. 4 is a side view of same, reversed right for left, and showing the suspensory member in its operative position.
Figure 5:
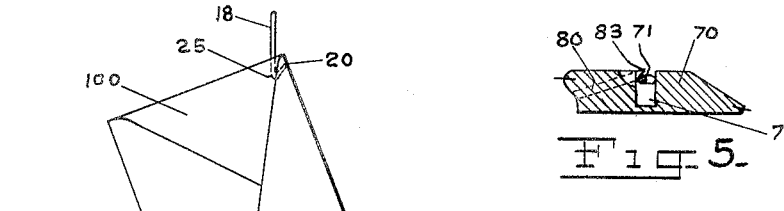
Fig. 5 is a section on the line 5—5 of Fig. 2.

One or more lateral notches 68 are provided, cut into the same face of the main body portion 60 with the slot 66, and preferably wedge-shaped as shown. In operating the weighing device, the suspensory member 61 is disengaged from the slot 66 by applying the fingers to the enlargement 67, and allowed to drop into a position analogous to the position of the member 71 as shown in Fig. 4, in which position an object to be weighed may be suspended from the hook portion thereof. A fulcrum, such as a knife blade or any other convenient object, is then provided, and the main body 60 rested thereupon at one or another of the notches 68. Each of these notches is so spaced on the body 60 as to correspond with a given weight, which may either be indicated on the body 60 itself or stated in instructions which accompany the device. For instance, in order to weight letters for mailing, the notch shown at the left hand of Fig. 1 may correspond to a weight of one ounce, the center notch to a weight of two ounces, and the right hand notch to three ounces. If then a letter which is suspended from the member 61 does not cause the device to overbalance when fulcrumed at any given notch, the weight of the letter is less than the weight which corresponds to the notch employed, and the legal postage for such weight will therefore be sufficient for the letter. If, however, the device does overbalance, another notch must be employed in order to ascertain the necessary postage.

While I prefer a notch of the form shown, I do not wish to limit myself to any particular means on the elongated member adapting it to be supported on a fulcrum at different points. Alternative means will readily suggest themselves, such as a depression or a loop in the side or top of the elongated member adapted to have upholding means attached to the elongated member adapted to suspend it from above; or such as a stirrup-shaped means adapted to slip loosely over the elongated member and to be moved back and forth on the same, the crosspiece or footpiece at the bottom of the stirrup being adapted to support the elongated member, and the stirrup-like means being suspended from a point above the elongated member. Such and similar means are all variations within the spirit and scope of my invention.

Figure 6:
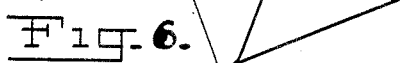
Fig. 6 is a view showing the proper manner of suspending a closed envelope for the purpose of weighing same, this same manner of suspension being employed with each one of the embodiments illustrated in the drawing when weighing a letter, and herinafter to be described.

Referring now particularly to Fig. 6, this figure illustrates the preferred method of suspending an envelope to be weighed, since it is found that by suspending it in this manner, the envelope may be engaged upon the hook with sufficient positiveness to permit weighing, without however unduly mutilating the paper. The point of the hook, here designated 20 may be made very sharp, so that it will catch into the material of the envelope without perforating it. In this figure the envelope has been designated by the number 100. The suspensory member with its hook as shown in Fig. 6 may be either the member 61 of Fig. 1 or the member 71 of Figs. 2 to 5 inclusive. Fig. 6 is intended to show the mode of use, which is similar in each embodiment.

Figure 2:
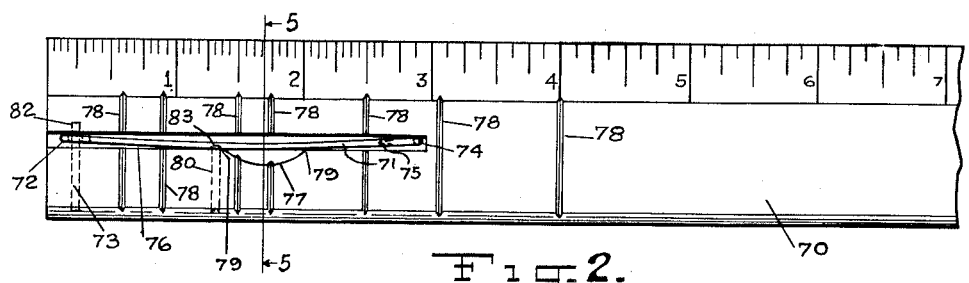
Fig. 2 is a top view of a ruler, in which another embodiment of my invention has been incorporated, showing the same in a closed or inoperative position.

In the embodiment shown in Figs. 2 to 5 inclusive, the weighing device is incorporated in a ruler of the ordinary type, designated 70. There is provided a retractable suspensory member 71, pivoted by means of a ring portion 72 which engages with a pin 73. This pin 73 is driven into the ruler from one edge, as best shown at the left of Fig. 2, and also in Fig. 4, and extends inward for a sufficient distance so that it passes entirely through the slot (here designated 76) and the inner end 82 thereof penetrates for a short distance into the material of the ruler.

The member 71 is provided at its free end with a hook composed of a shoulder 74 and a pointed end 75; and the ruler 70 is provided with a slot 76 having an enlarged finger-nail hold 77, and with a series of fulcrum notches 78, all analogous to corresponding parts shown in Fig. 1 and described above. The suspensory member 71 is made of resilient material, and is bowed laterally in the same manner as is the member 61 of the embodiment shown in Fig. 1, so that when forced into the slot 76, it will be straightened out against its natural rest form, and thus bear resiliently against the sides of the slot 76 at the points 79 in a manner analogous to that employed in the embodiment shown in Fig. 1. In this embodiment there is also provided a pin 80 driven obliquely into the material of the ruler, and having its inner end 83 projecting into the upper part of the slot 76 at one side thereof for a short distance, in order positively to catch and hold the member 71 in its folded or inoperative position when desired.

Figure 3:
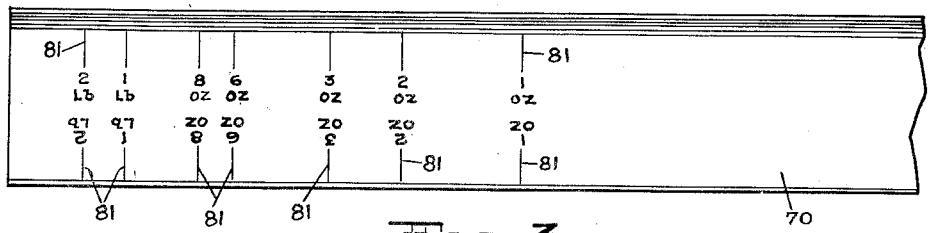
Fig. 3 is a bottom view of the ruler shown in Fig. 2.

Referring now particularly to Fig. 3, which represents the reverse side of the ruler, designating marks 81 are provided, each labeled with the weight which corresponds to that fulcrum groove 78 which lies underneath it when the device is placed in its operative position as shown in Fig. 4. These designating marks each extend to both edges of the ruler, and terminate in register with the fulcrum grooves 78 thereunder, so that when a knife blade or other object is used as a fulcrum and placed in a notch, the weight designation will be instantly apparent without looking at the notch. A duplicate numeral is provided with each designating mark, arranged as shown in Fig. 3, in order that the weight designation may appear right side up, regardless of whether the device is employed in a right-handed or left-handed manner.

The operation of weighing and preparing the device for use in this embodiment is performed in a manner similar to that of the embodiment shown in Fig. 1, while the operation of reading the weight will be obvious from what has been said above.

By employing the above described invention in any of its various embodiments, the user is enabled quickly and accurately to weigh any object which may be suspended from the retractable suspensory member, and especially to determine whether the object falls within a given weight class such as designated by postal regulations, by means of a device which employs the steelyard principle and embodies the advantages thereof, which device being incorporated in a pencil, ruler or other object which is already on hand thereby eliminates the necessity of providing a separate weighing device, which device may be easily and cheaply manufactured, and in which the operative parts may be protected and prevented from causing inconvenience when the device is not employed for weighing.

Other advantages of the invention will be obvious from what has been above said with regard to its construction and operation.

I do not limit myself to the particular details of construction set forth in the foregoing specification and illustrated in the accompanying drawing, as the same refer to and set forth only certain embodiments of the invention, and it is obvious that the same may be modified, within the scope of the appended claims, without departing from the spirit and scope of the invention.

Having thus described my invention, what I claim as new and desire to secure by Letters Patent is as follows:

1. A balance comprising an elongated member provided with an opening in its outer surface, a laterally flexible resilient suspensory member pivoted thereto, whereby said suspensory member is adapted to lie within said opening when in its inoperative position and to bear by resilient pressure against the side of said opening, and whereby also said suspensory member is adapted to swing freely from said elongated member when the latter is held in a substantially horizontal position, said suspensory member being provided with a hook at the free end thereof, and means whereby said elongated member may be fulcrumed.

2. A balance comprising an elongated member provided with an opening in its outer surface, a laterally flexible resilient suspensory member pivoted thereto, whereby said suspensory member is adapted to lie within said opening when in its inoperative position and to bear by resilient pressure against the side of said opening, and whereby also said suspensory member is adapted to swing freely from said elongated member when the latter is held in a substantially horizontal position, said suspensory member being provided with a hook at the free end thereof, and a plurality of notches on said elongated member each corresponding with a given weight whereby said elongated member may be fulcrumed.

3. A balance comprising an elongated member provided with an opening in its outer surface, and a laterally flexible resilient suspensory member pivoted thereto, whereby said suspensory member is adapted when in its inoperative position to lie within said opening and to bear by resilient pressure against the side of said opening, and whereby also said suspensory member is adapted to swing freely from said elongated member when the latter is held in a substantially horizontal position, said suspensory member being provided with a hook at the free end thereof.

4. A balance comprising an elongated member provided with an opening in its outer surface, a laterally flexible hooked resilient suspensory member pivoted thereto, whereby the hook is adapted when in its inoperative position to lie within said opening and to bear by resilient pressure against the side of said opening, and whereby also said hook is adapted to swing freely from said elongated member when the latter is held in a substantially horizontal position, and a projection on said elongated member adapted to engage said suspensory member when same is in its inoperative position.

5. A balance comprising an elongated member provided with an opening in its outer surface, and a laterally flexible hooked suspensory member pivoted thereto, whereby the hook is adapted when in its inoperative position to lie within said opening and to bear by resilient pressure against the side of said opening, and whereby also said hook is adapted to swing freely from said elongated member when the latter is held in a substantially horizontal position, a plurality of notches on said elongated member each corresponding with a given weight whereby said elongated member may be fulcrumed, and a corresponding plurality of weight designations on the opposite side of said elongated member from said notches and in register with each of said notches respectively.

6. A balance comprising an elongated member provided with a longitudinal opening in its outer surface, said opening having a central lateral extension, and a laterally flexible resilient suspensory member pivoted in said opening, whereby said suspensory member is adapted to lie within said longitudinal opening when in its inoperative position and to bear by resilient pressure against a corner formed by the junction of said longitudinal opening and said lateral extension, and whereby also said suspensory member is adapted to swing freely from said elongated member when the latter is held in a substantially horizontal position, said suspensory member being provided with a hook at the free end thereof.

JOHN H. HOTSON.